Jan. 6, 1931.                D. F. FESLER                1,787,440
                          LUBRICANT COMPRESSOR
                          Filed Dec. 20, 1922
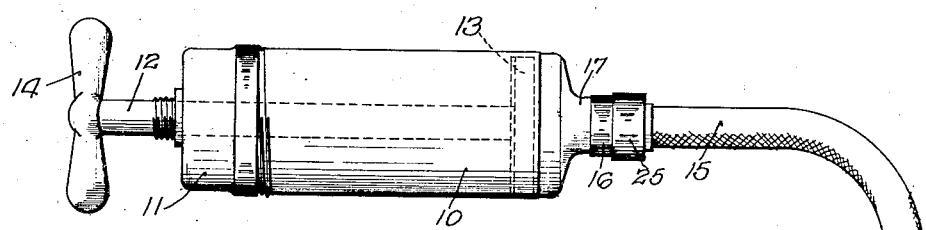
FIG. 1
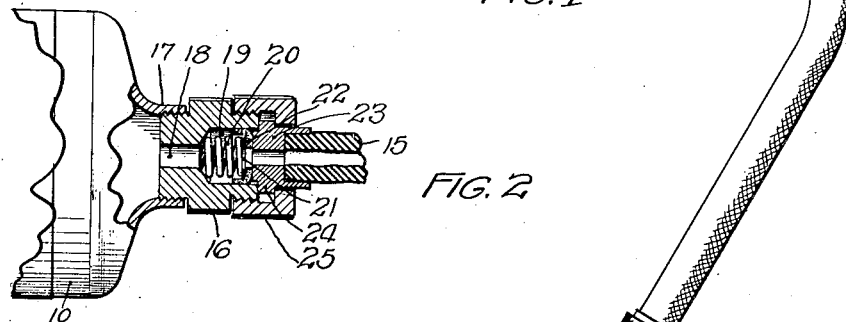
FIG. 2
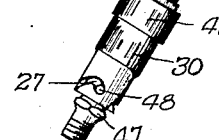
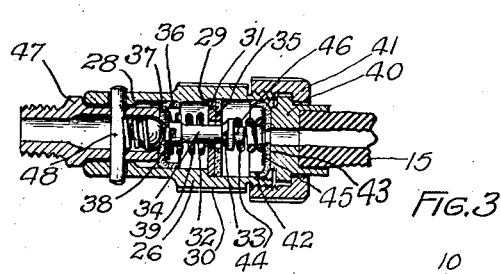
FIG. 3
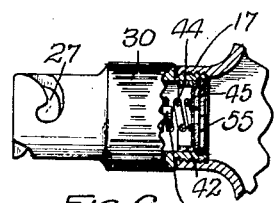
FIG. 6
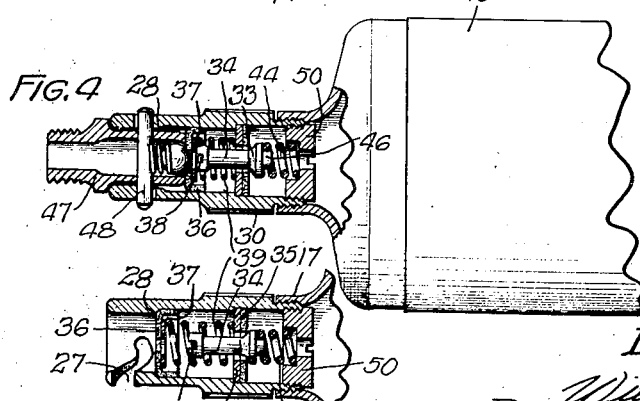
FIG. 4
FIG. 5
INVENTOR:
DOUGLAS F. FESLER
By Williams Bradbury
McCabe & Pinu
ATTYS.

Patented Jan. 6, 1931

1,787,440

UNITED STATES PATENT OFFICE

DOUGLAS F. FESLER, OF CHICAGO, ILLINOIS, ASSIGNOR TO ALEMITE CORPORATION, OF CHICAGO, ILLINOIS, A CORPORATION OF DELAWARE

LUBRICANT COMPRESSOR

Application filed December 20, 1922. Serial No. 607,954.

My invention relates to improvements in lubricant compressors, and is particularly concerned with improvements in that type of lubricant compressor which comprises a means for subjecting the lubricant to high pressure, and a discharge conduit comprising a coupling member adapted to make successive detachable connections with fittings or nipples secured to the bearings to be lubricated.

One of the objects of my invention is to provide a lubricant compressor of the character described, which is constructed so that the coupling member may be secured directly to the barrel of the compressor, or to one end of a flexible conduit, the other end of which is in turn secured to the compressor so that in one case the coupling member may be manipulated by merely grasping the handle or the barrel of the compressor, while in the other case connection can be made with a fitting so located that it would be inaccessible were the coupling member connected directly to the barrel of the compressor.

Another object of my invention is to provide a lubricant compressor comprising a coupling member having a gasket for making sealed connections with the fittings mounted on the bearings to be lubricated, and a valve for controlling the supply of lubricant to the bearing, the gasket and valve being so related that the valve is opened by the gasket when a fitting is received by the coupling member.

Another object of my invention is to provide a lubricant compressor comprising a coupling member of the character described, in which the gasket and the valve are so arranged that the valve is not opened until after a positive initial seal has been established between the gasket and the fitting, and so arranged that when the coupling member is detached from the fitting, the valve will be closed before the seal between the gasket and the fitting is broken.

A still further object of my invention is to provide a lubricant compressor, such as described, in which the gasket continues its outward movement in the coupling member after the valve has been closed, thereby producing a suction behind the gasket which removes any lubricant which would otherwise tend to stick to the end of the fitting.

Still another object of my invention is to provide a lubricant compressor having a coupling member swiveled thereon, a valve for controlling the flow of lubricant through said coupling member, a gasket for sealing the swivel joint between said coupling member and said compressor, and a single spring for actuating said valve and for moving said gasket in its sealed position.

An additional object of my invention is to provide a lubricant compressor of the character described, which is simple in construction, economical to manufacture, and easy to operate.

Other objects will appear as this description progresses, reference being had to the accompanying drawings, in which Figure 1 is a side elevation of a compressor embodying my invention;

Figure 2 is a longitudinal sectional detail through the swivel connection between the compressor barrel and the flexible discharge conduit;

Figure 3 is a central longitudinal section through the valved coupling member, showing it attached to the end of the flexible conduit;

Figure 4 is a view similar to Figure 3, but showing the coupling member attached directly to the compressor barrel;

Figure 5 is a view similar to Figure 4, but showing the positions of the gasket and valve when the coupling member is not attached to a fitting, and Figure 6 is a sectional detail of a modified form of my invention.

Throughout the several views, similar reference characters will be used for referring to similar parts.

My improved compressor comprises a barrel 10, which I have here illustrated as being of conventional construction, and which comprises a cap 11, which is detachably connected with the open end of the barrel, and a threaded piston rod 12 which extends through the cap and carries a suitable head 13 at its inner end. The handle 14 on the outer end of the piston rod 12 provides means whereby the piston rod may be rotated.

This compressor, as shown in Figure 1, is provided with a flexible discharge conduit 15, which is connected with the compressor barrel by the means shown in Figure 2. One threaded end of the union 16 screws into the internally threaded discharge nipple 17 of the compressor barrel. The outer end of the bore 18 in the union 16 is enlarged in diameter, as shown at 19, for receiving a compression spring 20, the outer end of which holds the cup leather or gasket 21 in tight engagement with the boss 22 formed on the inner end of the swivel member 23. This member has a cup-shaped depression formed in its outer end, in which one end of the flexible discharge conduit 15 is secured by soldering, or in any other suitable manner. An annular rib 24 projects outwardly from the swivel member 23 adjacent its inner end, and is held in place by means of the follower 25 which bears against the outer side of the rib 24, and is threaded onto the outer end of the union 16. This follower is not turned down too tightly to prevent the member 23 from rotating relatively to the union 16.

The coupling member at the opposite end of the flexible discharge conduit 15 comprises a sleeve 26, the outer end of which is provided with the inclined bayonet slots 27, which, as shown in Figures 1 and 6, incline slightly in an outward direction adjacent their inner ends. The diameter of the bore of the sleeve 26 is enlarged at intervals to provide the shoulders 28 and 29, and the exterior of the sleeve may be knurled, as indicated at 30, to provide a convenient surface for grasping.

A disc 31 resting against the shoulder 29, and having a central port 32 extending therethrough, provides a seat for the valve head 33 which is carried by the inner end of the valve stem 34. I prefer to insert a thin gasket 35 of leather, or other suitable material, between the disc 31 and the valve head 33 to assure complete sealing of the valve head against its seat.

Slidably mounted between the outer end of the sleeve 26 and the disc 31 is a cup leather or gasket 36 of leather, or any other suitable material, which is provided with a central aperture for the discharge of lubricant. The central portion of this gasket is preferably backed by means of a metal washer 37 having an aperture registering with that of the gasket. The outer end of the valve stem 34 has a channel 38 cut thereacross to provide a passageway for the lubricant. A spiral spring 39, confined between the disc 31 and the washer 37, provides means for yieldingly urging the gasket to its outermost position, as will be referred to later.

The outer end of the flexible conduit 15 is connected with the sleeve 30 by means of a swivel member 40 and a follower 41, which are, respectively, similar to the swivel member 22 and the follower 25 of Figure 2 heretofore described. For sealing the connection between the swivel member 40 and the sleeve 26, I provide a cup leather 42 which bears against the boss 43 at the inner end of the swivel member 40, and is held in this position by means of a spiral spring 44, one end of which bears against a washer 45 seated in the gasket 42, and the other end of which bears against the valve head 33. The valve head 33 is provided with a central boss 46 for holding the outer end of the spring 44 in position.

When it is desired to connect the coupling member just described with the fitting or nipple 47 having the cross pin 48, the coupling member is placed over the fitting so that the ends of the bayonet slots 27 receive the ends of the cross pin 48. A slight pressure is then exerted on the coupling member in the direction of the fitting, and at the same time the sleeve 26 is rotated in a direction to cause the outer edges of the slots 27 to act as cams to draw the coupling member onto the fitting. When the coupling member is first placed over the fitting, the end of the fitting makes contact with the gasket 36, which, as shown in Figure 5, is initially spaced from the inner end of the valve stem 34, and there is considerable inward movement of the gasket 36 before the washer 37 makes contact with the outer end of the valve stem 34. Continued inward movement of the gasket causes the valve to open against the tension of the spring 44, so that the lubricant can flow into the chamber housing the spring 39 and from thence through the cross channel 38, out through the gasket 37 and into the fitting.

It will thus be seen that the pressure of the lubricant acting against the inner face of the gasket 36 will not only cause it to press more tightly against the fitting, but also against the walls of the sleeve 26, thus effectively preventing the escape of lubricant. It will, of course, be seen that before the lubricant pressure is exerted upon the gasket, there is an initial pressure exerted thereon by the spring 39, which effectively prevents the escape of lubricant between the gasket and the fitting.

In completing the connection between the coupling member and a fitting, the ends of the cross pin 48 travel outwardly in the inner ends of the bayonet slots 27, thus locking the coupling member to the fitting under the pressure of the two springs, and subsequently under the pressure of the lubricant. This outward movement is not, however, sufficient to close the valve 33 on its seat.

In disconnecting the coupling member from a fitting, the coupling member is turned in the direction opposite that in which it is turned in making the connection, so that the ends of the cross pin 48 slide out of the bayonet slots 27. During the first part of this movement, the valve 34 and the gasket 37 move outwardly under the influence of the two springs until a position is reached where the valve head 33 closes upon its seat. Thereafter the gasket 36 continues to move outwardly under the pressure of the spring 39, and thereby creates a void or vacuum behind it which, at the instant the coupling member is detached from the fitting, draws in any lubricant which might otherwise tend to remain on the outer end of the fitting.

For supplying lubricant to fittings located in some positions, it is desirable to have the coupling member secured directly to the end of the lubricant compressor, and this change in construction can be effected readily with my construction by unscrewing the sleeve 26 from the follower 41, removing the gasket 42 and the washer 45 from the inner end of the sleeve 26, and replacing them by the threaded plug 50 (see Figures 4 and 5) which holds the spring 44 in position. The inner end of the sleeve 26 can then be screwed into the end of the compressor barrel, as shown in Figures 4 and 5.

In the form of my invention illustrated in Figure 6, the spring 44, the gasket 42, and the washer 45 are held in place by means of a split ring 55 which is seated in a suitable groove formed in the interior wall of the sleeve 26 and projecting outwardly over the gasket. With this construction, the coupling member can be attached to either the compressor barrel or the discharge conduit without any alterations. Otherwise, the construction shown in Figure 6 is similar to that heretofore described.

While I have described the details of the preferred embodiment of my invention, it is to be clearly understood that my invention is capable of other adaptations and modifications within the scope of the appended claims.

Having thus described my invention, what I claim is:

1. A lubricant compressor comprising a barrel having a discharge conduit provided at its free end with a coupling member for making a detachable connection with a second coupling member, said first named coupling member including a tubular member having a valve seat intermediate its ends, a valve stem extending through the opening in said valve seat and spaced from the edges thereof, a gasket slidably mounted in one end of said tubular member, a spring interposed between said gasket and said valve seat, a valve head carried by said valve stem for coacting with said valve seat, a member swiveled on the other end of said tubular member for establishing communication between said tubular member and said conduit, a gasket bearing against the inner end of said swiveled member, and a spring confined between said gasket and said valve head, there being a lost motion connection between said valve stem and said first named gasket.

2. A lubricant compressor comprising a barrel having a discharge conduit provided at its free end with a coupling member for making a detachable connection with a second coupling member, said first named coupling member including a tubular member having a valve seat intermediate its ends, a valve stem extending through the opening in said valve seat and spaced from the edges thereof, a gasket slidably mounted in one end of said tubular member, a valve head carried by said valve stem for coacting with said valve seat, a member swiveled on the other end of said tubular member for establishing communication between said tubular member and said conduit, a gasket bearing against the inner end of said swiveled member, and a spring confined between said gasket and said valve head.

3. A lubricant compressor comprising a barrel having a discharge conduit provided at its free end with a coupling member for making a detachable connection with a second coupling member, said first named coupling member including a tubular member having a valve seat intermediate its ends, a valve stem extending through the opening in said valve seat and spaced from the edges thereof, a gasket mounted in one end of said tubular member, a valve head carried by said valve stem for coacting with said valve seat, a swivel member on the other end of said tubular member for establishing communication between said tubular member and said conduit, a gasket bearing against the inner end of said swiveled member, and a spring confined between said gasket and said valve head.

4. A lubricant compressor comprising a barrel having a discharge conduit provided at its free end with a coupling member for making a detachable connection with a second coupling member, said first named coupling member including a tubular member having a valve seat intermediate its ends, a valve stem extending through the opening in said valve seat and spaced from the edges thereof, a gasket mounted in one end of said tubular member, a valve head carried by said valve stem for coacting with said valve seat, a swivel member on the other end of said tubular member for establishing communication between said tubular member and said conduit, and a spring reacting against said valve head and said swivel member last mentioned for urging said valve and valve stem outwardly.

5. A lubricant compressor having a discharge conduit comprising a tubular member having a valve seat intermediate its ends, a valve stem passing through said seat, a valve carried by the inner end of said stem for coacting with said seat, a spring acting on said valve for urging said valve stem outwardly, and a gasket slidably mounted in the outer end of said tubular member and movable relative to said valve stem, said valve stem having a part for urging said gasket towards its outer position.

6. A lubricant compressor comprising a barrel and a coupling member for making a detachable connection with a second coupling member, said first named coupling member being connected with said barrel by a swivel connection, a gasket for sealing said connection, a valve for controlling the flow of lubricant from said barrel, and a common spring for holding said gasket in its sealing position and for closing said valve.

7. A lubricant compressor comprising a coupling member having an inlet and an outlet connection, a gasket for each connection, a valve intermediate said gaskets, and a single spring for actuating said valve and for urging said gaskets in opposite directions.

In witness whereof, I hereunto subscribe my name this 15th day of December, 1922.

DOUGLAS F. FESLER.